Oct. 22, 1968     G. E. KILBEY     3,406,984
VEHICLE STEPS

Filed Aug. 27, 1965     5 Sheets-Sheet 1

INVENTOR.
GEORGE E. KILBEY
BY *M. A. Hobbs*
ATTORNEY

Oct. 22, 1968     G. E. KILBEY     3,406,984
VEHICLE STEPS

Filed Aug. 27, 1965     5 Sheets-Sheet 2

INVENTOR.
GEORGE E. KILBEY
BY *M. A. Hobbs*
ATTORNEY

Oct. 22, 1968

G. E. KILBEY 3,406,984

VEHICLE STEPS

Filed Aug. 27, 1965

INVENTOR.
GEORGE E. KILBEY
BY M. A. Hobbs
ATTORNEY

Oct. 22, 1968   G. E. KILBEY   3,406,984
VEHICLE STEPS

Filed Aug. 27, 1965   5 Sheets-Sheet 4

INVENTOR.
GEORGE E. KILBEY
BY M. A. Hobbs
ATTORNEY

United States Patent Office 3,406,984
Patented Oct. 22, 1968

3,406,984
VEHICLE STEPS
George E. Kilbey, Mishawaka, Ind., assignor to Meyer Stamping & Manufacturing Co., Fort Wayne, Ind.
Filed Aug. 27, 1965, Ser. No. 483,134
4 Claims. (Cl. 280—166)

ABSTRACT OF THE DISCLOSURE

A vehicle step structure having a frame adapted to be suspended beneath the vehicle bed or body and a retractable and extensible step portion held in the two positions by a securing means which prevents dislodgement of the steps while the vehicle is in motion and which holds the steps firmly in place in their extended position.

The conventional campers, camper coaches and mobile homes have normally had the main door positioned at a distance above the ground greater than a normal step height, requiring at least one step, either mounted on the vehicle or placed on the ground to provide easy access to the door. The steps have usually been a single step on a mechanical support on the vehicle which can be folded out and in when the vehicle is parked and the door is to be used. The bottoms of the doors in many of the vehicles are often too high from the ground for merely a single step, or the ground in some locations is uneven so that the step is either too far from or too close to the ground for convenience. As an alternative to the foldable step mounted on the vehicle, separate single or multiple step structures have been extensively employed, but these have likewise been inconvenient and unsatisfactory in many instances, in that the steps must be lifted bodily and placed on the vehicle when the vehicle is to be moved, and the step structure, whether a single or double step arrangement, when placed on the ground does not provide the proper height between the top step and the bottom of the vehicle door for convenient and easy access to and from the door. It is therefore one of the principal objects of the present invention to provide a step structure for vehicles of the foregoing types, which can be fully retracted into the confines of the vehicle structure when the vehicle is to be moved or stored, and which can be extended into step position, where it will remain firmly and rigidly to give safe and reliable footing with the distance from the ground to the first step and from the top step to the bottom of the door always being the same over a relatively wide range of ground conditions and relationships to the bottom of the vehicle door.

Another object of the present invention is to provide a retractable step structure which rests on the ground when extended to give firm footing to the structure and which is attached to the vehicle to assure proper positioning of the step structure to the bottom of the door and to give substantial support to the structure when it is being used.

Still another object of the invention is to provide a step structure which can easily and quickly be retracted and extended, and which can easily be secured in either position so that it will not become accidentally dislodged while the vehicle is moving, or displaced while the steps are being used.

A further object is to provide a retractable step structure of the aforesaid type which can readily be adapted to a variety of different vehicles and different locations on the vehicles without any substantial changes or modifications being required in the basic step structure and which can easily be modified to provide either a single or multiple step construction.

Additional objects and advantages of the present invention will become apparent from the following description and accompanying drawings, wherein.

Figure 1:
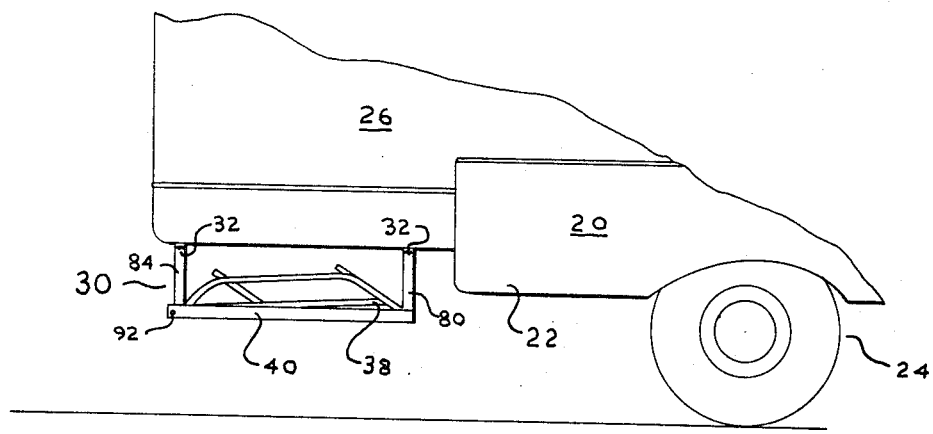
FIGURE 1 is a fragmentary side elevational view of a pick-up truck with a camper mounted thereon and with the present retractable step mounted on the bottom of the camper, the step structure being shown in its retracted position.
Figure 2:
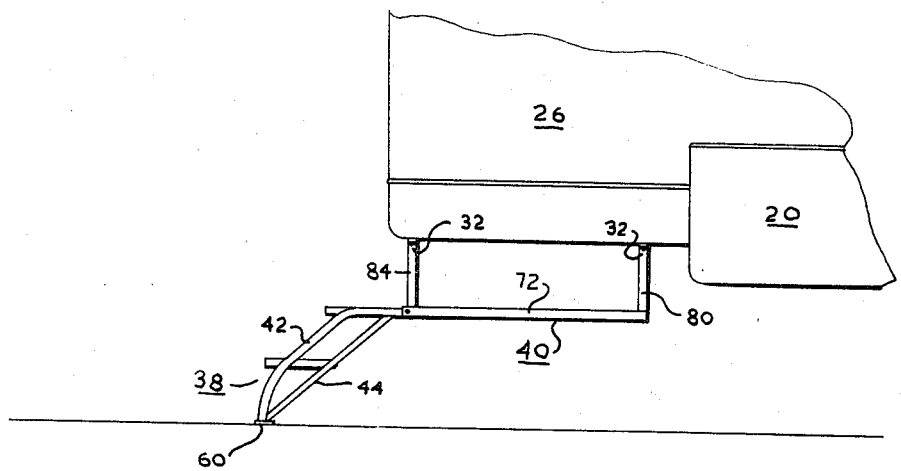
FIGURE 2 is the same elevational view of the truck and camper with the present step mounted thereon, the step being shown in its extended position for use.
Figure 3:
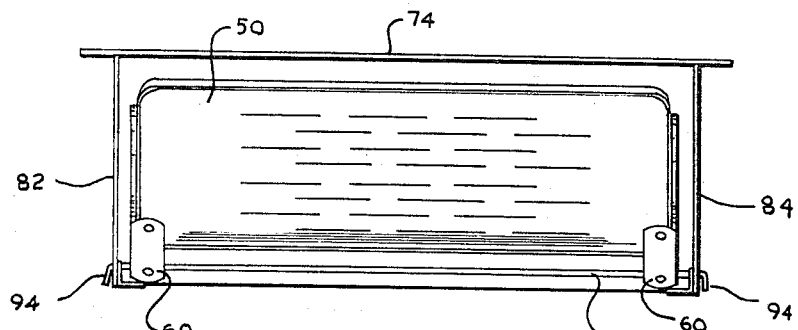
FIGURE 3 is an end elevational view of the step showing it in its retracted position.
Figure 9:
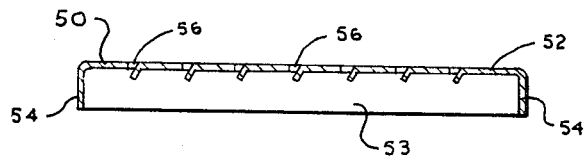
FIGURE 9 is a cross sectional view of one of the steps taken on line 9—9 of FIGURE 4.
Figure 10:
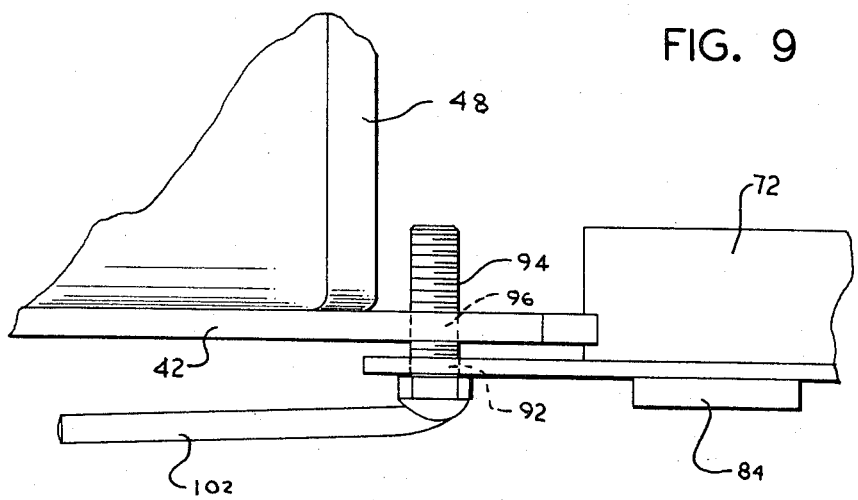
FIGURE 10 is an enlarged fragmentary plan view of the step and supporting structure, showing the manner in which the two are secured together when the step is in its extended position.
Figure 7:
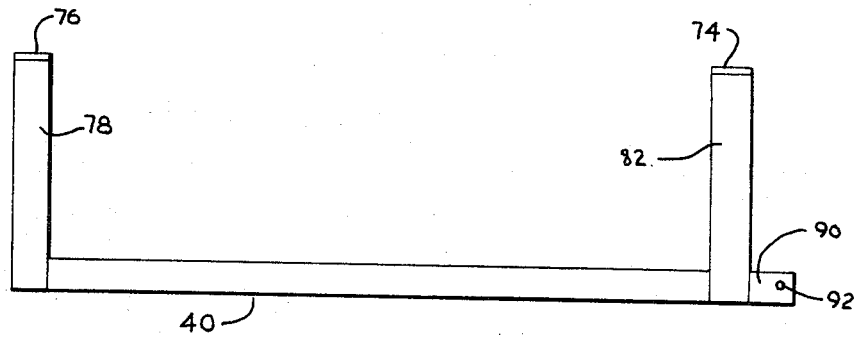
FIGURE 7 is a side elevational view of the structure for supporting the step.
Figure 5:
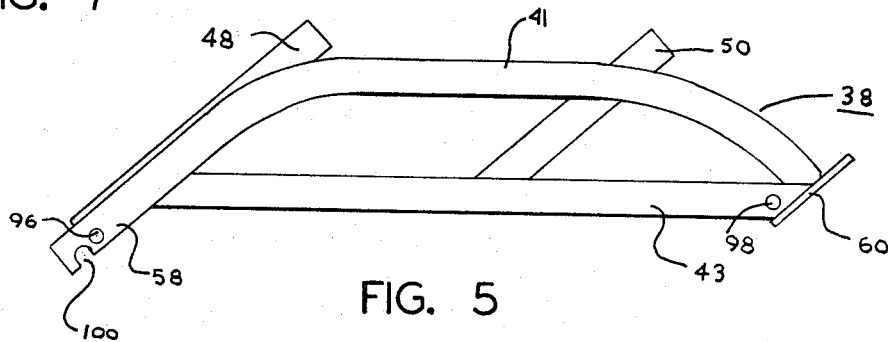
FIGURE 5 is a side elevational view of the step section, showing it apart from the step frame.
Figure 4:
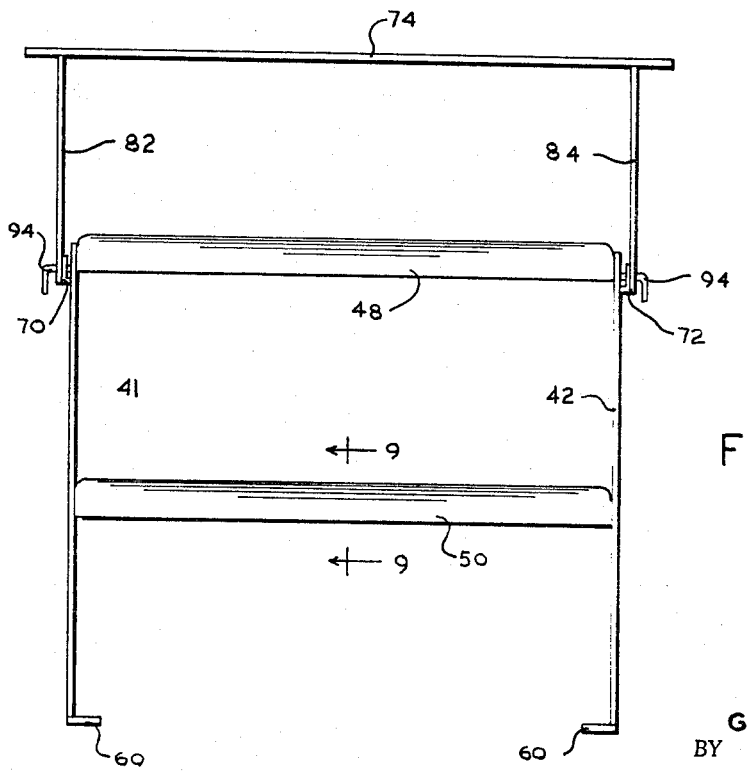
FIGURE 4 is an end elevational view of the step showing the step in its extended position.
Figure 6:
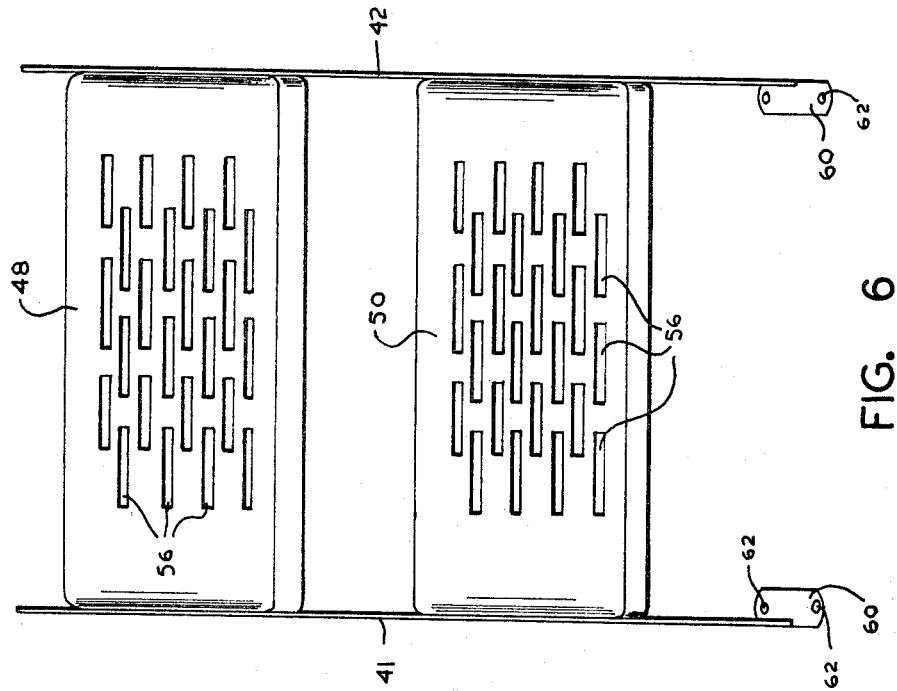
FIGURE 6 is a plan view of the step showing it apart from the supporting structure.
Figure 8:
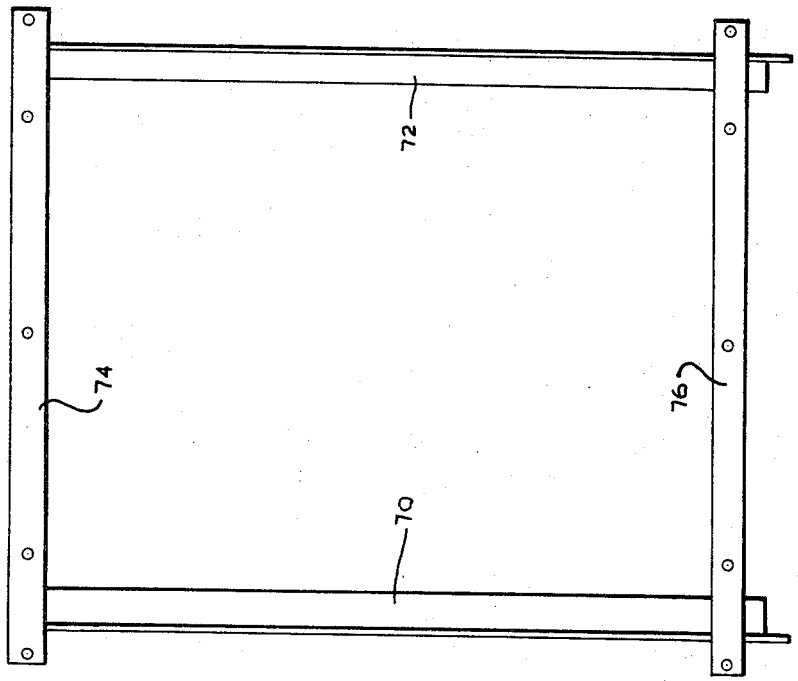
FIGURE 8 is a plan view of the supporting structure shown in FIGURE 7.

Referring more specifically to the drawings and to FIGURES 1 and 2 in particular, numeral 20 designates a pick-up truck having a bed 22 thereon with an open end normally closed by a tail-gate, and supported on a chassis generally indicated by numeral 24. A camper coach of generally well known construction and design is indicated by numeral 26 and is mounted on the truck bed 22 and projects rearwardly therefrom. The present retractable step, which is indicated by numeral 30, is mounted on the underside of the camper coach by any suitable securing means, the means shown in the drawings being bolts 32 extending through the upper portion of the step structure into the frame or body of camper coach 26. The present step structure is readily adapted to a variety of different vehicles and vehicle bodies in addition to that shown in the drawings, such as campers, mobile homes, trailers normally towed by another vehicle, and bodies on vehicles driven as a separate unit, the present step structure, in most instances, being secured to the underside of the body or bed of the vehicle adjacent the door thereof.

The present step structure consists of a step section 38 and a supporting structure 40 for receiving and supporting the step section when the section is retracted and for holding the upper end of the step section when the step section is in its extended position, both positions being illustrated in FIGURES 1 and 2. The step section 38 consists of two laterally spaced members 41 and 42 curved inwardly at each end and joined to the ends of side members 43 and 44, respectively, by welding or any other suitable securing means. In the embodiment of the invention illustrated in the drawings, two steps 48 and 50 are rigidly secured to the four side members at an angle to inner side members 41, 42, 43 and 44, the steps preferably being secured to said side members by welding, riveting, bolting or other suitable securing means which will form a rigid step section structure. Each step consists of a flat panel 52 and end and side flanges 53 and 54, the panel having a plurality of perforations 56 for providing a good footing and permitting water and dirt to run or fall from the step, thereby giving more secure footing by eliminating slipping. The end flanges are welded or otherwise secured to the side members and the side flanges 54 give additional strength to the panel 50 and provide a more pleasing appearance.

The upper end 58 of each front of side members 41 and 42 projects angularly from the step and is supported by frame structure 40 when the step is in its extended position. A foot 60 is provided at the lower end of the step section and is secured by welding or other suitable means to the respective side members. Holes 62 are provided in each foot so that a board or other member may be secured thereto if an additional step is desired. Otherwise the two feet rest on the ground and provide a substantial support or footing for the step section when it is in extended position.

Figure 11:
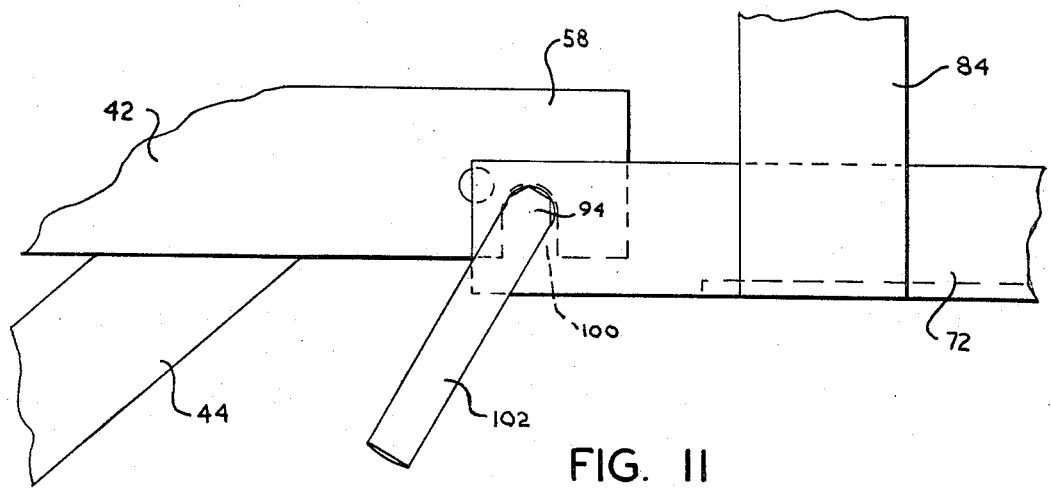
FIGURE 11 is an enlarged fragmentary side elevational view of the step section and supporting structure, showing the step held in one arrangement in its extended position.
Figure 12:
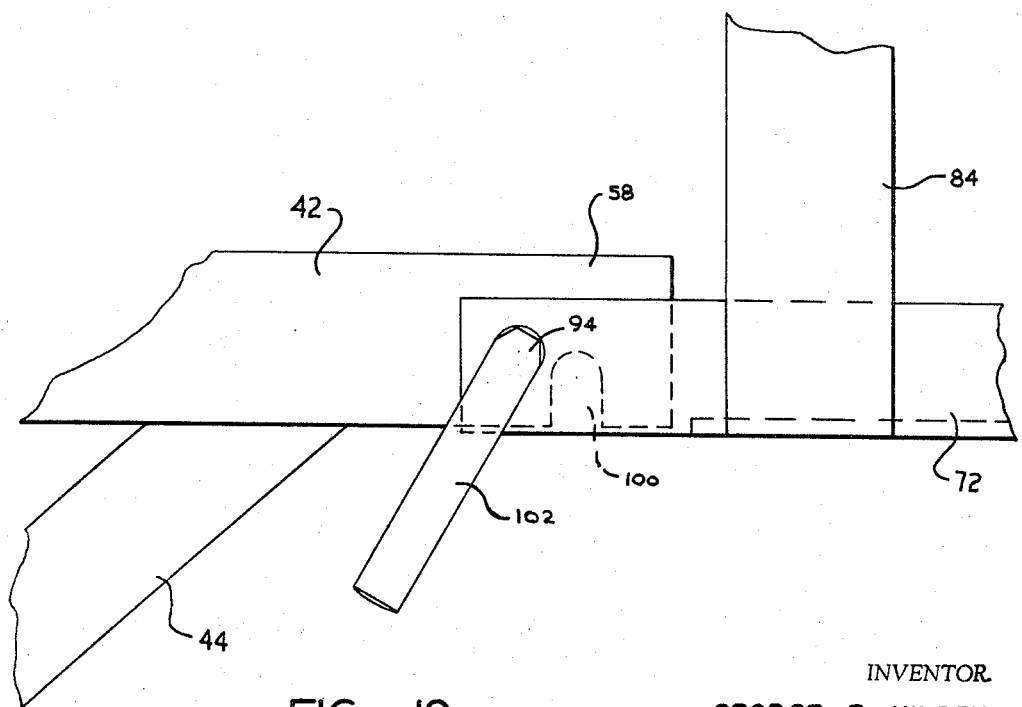
FIGURE 12 is similar to FIGURE 11 showing the step held in its extended position by another arrangement embodied in the present invention.

The supporting structure 40 consists of two longitudinal side members 70 and 72 supported from cross members 74 and 76 by rear vertical members 78 and 80 and front vertical members 82 and 84. The two side members are held rigidly in spaced relation by lower cross member 86 between the two rear vertical members 78 and 80, the members of the supporting structure being welded to one another to form a rigid structure. The forward ends 90 of the longitudinal side members 70 and 72 project beyond vertical members 82 and 84, respectively, and are provided with holes 92 for receiving screws 94 which extend through holes in the side members into forward members 41 and 42, the screws being threadedly received in holes 96 of the step section. Similar threaded holes 98 are provided in the lower end of side members 41 and 42 for receiving screws 94 when the step section is retracted into the supporting structure 40, screws 94 remaining threaded in holes 92 in both positions of the step section. Since in some instances, the steps may be used only a short time, the structure can be readily assembled for use by merely removing the screws and slipping the section out, placing notches 100 in extensions 58 and 60 over the screws, as illustrated in FIGURE 11, thus giving support for the upper end of the step section without having to remove the bolt and re-thread it into the step section, as illustrated in FIGURE 12. Unthreaded pins with cotter pins may be used in place of the threaded bolts 94.

In the use of the present structure, the step section is placed in its retracted position in supporting structure 40, as illustrated in FIGURE 1, and held therein by threading bolts 94 through holes 92 into holes 98 in the end of the step section. With the bolts in this position, the step section is held firmly in place in the supporting structure beneath the bed of the camper or other vehicle on which the steps are mounted. When it is desired to use the step, screws 94 are removed from holes 96 in the step section using handle 102, and the step section is slipped from the position shown in FIGURE 1 to the position shown in FIGURE 2, and the screw is inserted into hole 96 in each of the side members 41 and 42. With the step in this position, feet 60 rest firmly on the ground or pavement and the upper end is held rigidly in place by screws 94 and supporting structure 40. When the frame is to be returned, the screws 94 on each side are withdrawn from holes 96 and the step section is slipped upwardly and inwardly into the supporting structure, and the screws re-inserted in holes 98. When it is desired to use the steps only temporarily, the screws are removed from holes 96 and the frame slipped forwardly and downwardly until slots 100 slip over the inwardly protruding end of bolts 94, thereby forming an effective support means for the upper end of the step section.

The step section can be made with one, two or more steps, and under certain circumstances, these steps may be interchanged to accommodate the trailer on uneven ground or on an exceptionally high or low chassis. While several modifications have been suggested herein, other changes and modifications may be made without departing from the scope of the invention.

I claim:

1. A retractable and extensible step structure for vehicles, comprising a frame adapted to be mounted on the underside of the vehicles and having two longitudinal side members, two cross members above said longitudinal members and spaced therefrom, vertical members connecting said longitudinal and cross members, a step section for slipping into and from said frame above said longitudinal member and having two rear side members spaced laterally from one another of straight configuration, two front side members spaced laterally from one another with curved ends joined to the upper and lower ends of said rear side members, two steps disposed between and joined to each of said rear and said front side members and spaced upwardly from the lower ends of said front and rear side members when said step section is in its extended position, and threaded means in said frame for releasably securing said step section in its retracted position in said frame and for supporting the upper end of said step section when said section is in its extended position.

2. A retractable and extensible step structure for vehicles, comprising a frame adapted to be mounted on the underside of the vehicle and having two longitudinal side members, two cross members above said longitudinal members and spaced therefrom vertical members connecting said longitudinal and cross members, a step section for slipping into and from said frame above said longitudinal member and having two rear side members spaced laterally from one another of straight configuration, two front side members spaced laterally from one another with curved ends connected to the upper and lower ends of said rear side members, a plurality of steps disposed between and joined to each of said rear and said front side members and spaced upwardly from the lower ends of said front and rear side members when said step section is in its extended position, and means for releasably securing said step section in its retracted position in said frame and for supporting the upper end of said step section when said section is in its extend position.

3. A retractable and extensible step structure for vehicles, comprising a frame for connection to the underside of the vehicle, said frame having a longitudinal member, a step section for slipping into and from said frame above said longitudinal member and having two rear side members spaced laterally from one another of straight configuration, two front side members spaced laterally from one another with curved ends joined to the upper and lower ends of said rear side members, two steps disposed between and joined to each of said rear and said front side members and spaced upwardly from the lower ends of said front and rear side members when said step section is in its extended position, and means for releasably securing said step section in its retracted position in said frame and for supporting the upper end of said step section when said section is in its extended position.

4. A retractable and extensible step structure for vehicles, comprising a frame for connection to the underside of the vehicle, said frame having a longitudinal member, a step section for slipping into and from said frame above said longitudinal member and having two rear side members spaced laterally from one another of straight configuration, two front side members spaced laterally from one another with curved ends connected to the upper and lower ends of said rear side members, a plurality of steps disposed between and joined to each of said rear and said front side members and spaced upwardly from the lower ends of said front and rear side members when said step section is in its extended position, and means for retaining the upper end of said step section on said frame when the section is in either its retracted or extended positions.

References Cited

UNITED STATES PATENTS

| | | | |
|---|---|---|---|
| 1,148,356 | 7/1915 | Chickering | 105—449 |
| 2,153,045 | 4/1939 | Thelander | 105—449 |
| 2,551,345 | 5/1951 | Scott | 182—106 |
| 2,621,846 | 12/1952 | Knibbs | 182—88 |
| 2,659,902 | 11/1953 | Fitzgerald | 280—166 |
| 2,747,888 | 5/1956 | Jones | 182—88 |

BENJAMIN HERSH, *Primary Examiner.*

L. D. MORRIS, JR., *Assistant Examiner.*